(No Model.)  2 Sheets—Sheet 1.

A. C. ROPER.
BRAKE FOR CYCLES OR OTHER CARRIAGES HAVING RUBBER TIRED WHEELS.

No. 509,183.  Patented Nov. 21, 1893.

WITNESSES:

INVENTOR:
A. C. Roper.
Per. Robt. Ed. Phillips,
Attorney.

THE NATIONAL LITHOGRAPHING COMPANY,
WASHINGTON, D. C.

(No Model.) 2 Sheets—Sheet 2.
A. C. ROPER.
BRAKE FOR CYCLES OR OTHER CARRIAGES HAVING RUBBER TIRED WHEELS.
No. 509,183. Patented Nov. 21, 1893.
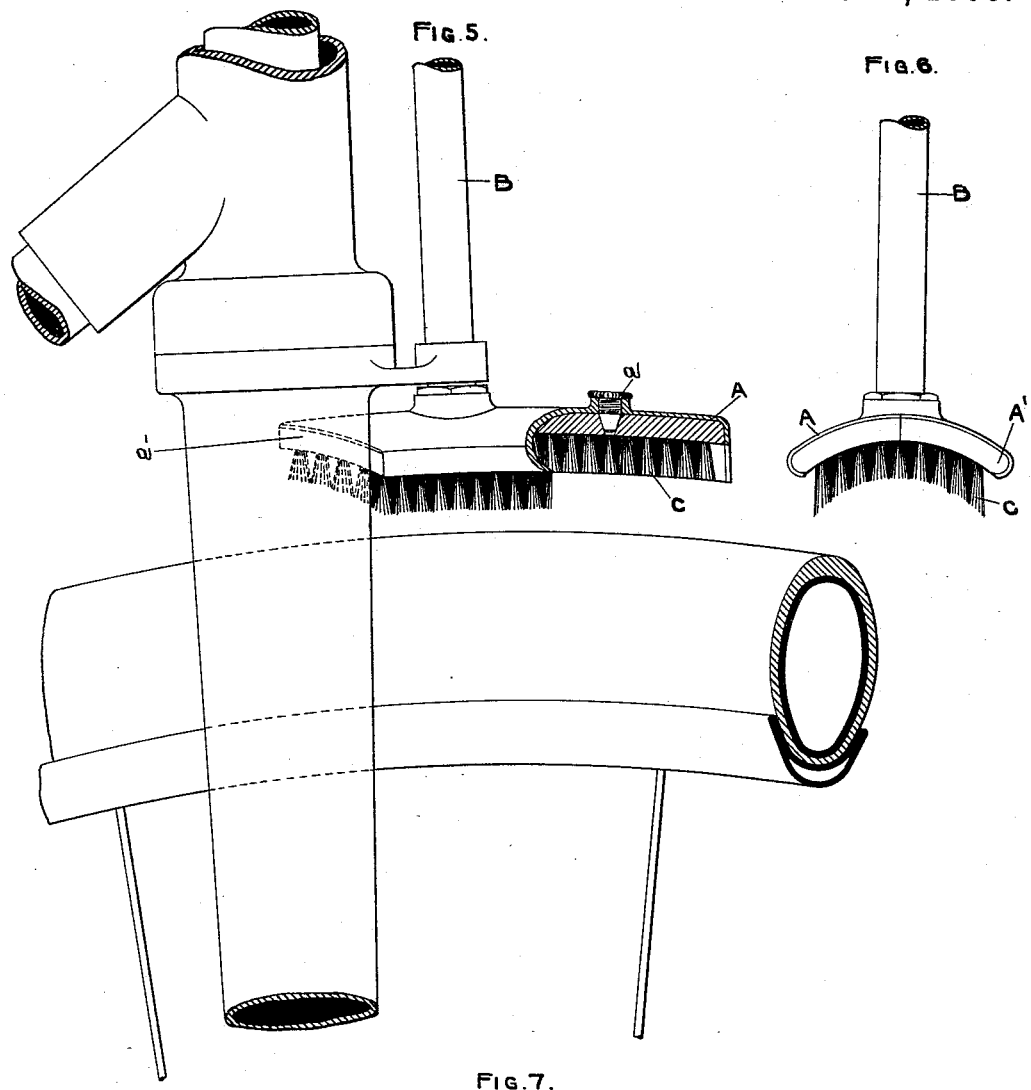
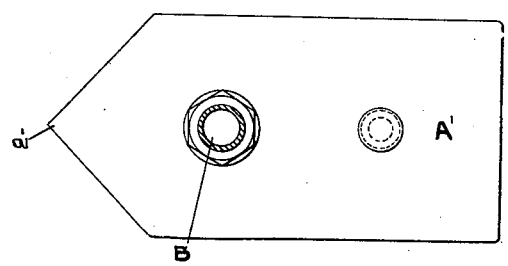

UNITED STATES PATENT OFFICE.

ARTHUR CHARLES ROPER, OF EXETER, ENGLAND.

BRAKE FOR CYCLES OR OTHER CARRIAGES HAVING RUBBER-TIRED WHEELS.

SPECIFICATION forming part of Letters Patent No. 509,183, dated November 21, 1893.

Application filed July 24, 1893. Serial No. 481,247. (No model.) Patented in England December 5, 1892, No. 22,203.

*To all whom it may concern:*

Be it known that I, ARTHUR CHARLES ROPER, a subject of the Queen of Great Britain, residing at Exeter, Devonshire, England, have invented a new and useful Improvement in Brakes for Cycles and other Carriages having Rubber-Tired Wheels, (for which I have obtained a patent in Great Britain, No. 22,203, dated the 5th of December, 1892,) of which the following is a specification.

My invention relates to an improved construction of brake for use on cycles and other carriages the wheels of which are shod with rubber tires, and it consists in making the brake block or spoon with a brush operating surface, curved transversely to fit the transverse shape of the tire and wedge-shaped at its rear end and in mounting the said brush in a shell-like shoe, the object being to remove grit, pieces of stone, or other material from the surface of the tire when applying the brake instead of rubbing them into the tire as is the case with the ordinary type of brake block or spoon, and so prevent destruction of the surface of the tire. I attain this end in the manner illustrated by the accompanying drawings, in which—

Figure 1:
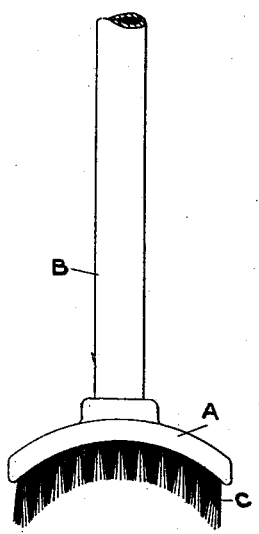
Figure 2:
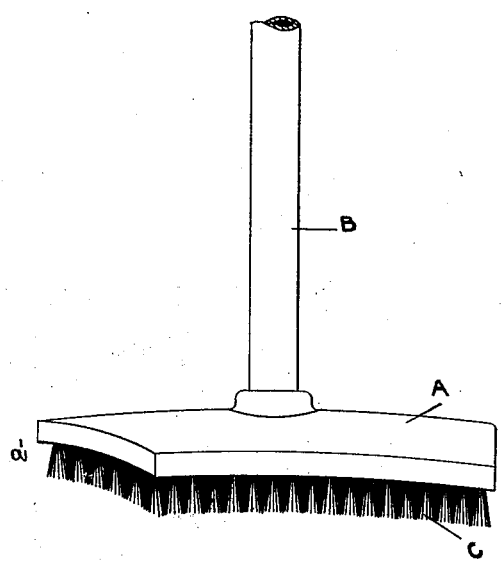
Figure 4:
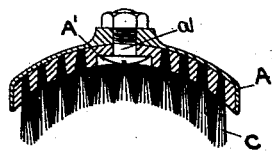
Figure 3:
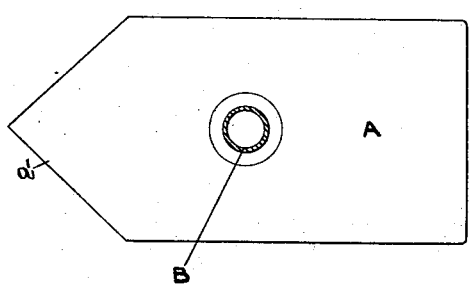

Figures 1, 2 and 3 Sheet No. 1 are views in front elevation, side elevation and plan respectively of my improved brake. Fig. 4 Sheet No. 1 is a view in transverse section of a modification in the construction of my improved brake. Fig. 5 Sheet No. 2 is a broken view in side elevation partly in section showing a further modification in the construction of my improved brake, and its application to a cycle, and Figs. 6 and 7 Sheet No. 2 are views in front elevation and plan respectively of the modification shown by Fig. 5.

Throughout the views similar parts are marked with like letters of reference.

The brake block or spoon consists of a rigid back A of metal or any other suitable material, to which the operating bar or its equivalent B is fixed or attached in any convenient manner.

To the under or operating side of the block or spoon A is fitted a series of tufts of bristles forming a brush surface C. The tufts of bristles may be made of hair, fiber, wire, rubber, or any other suitable material. The brush surface C is shaped to fit the tire both transversely and longitudinally and the block or spoon A may be similarly shaped, in which case the lengths of the tufts or bristles will be alike, but as an alternative construction the block or spoon may be made flat, in which case the tufts of bristles will be of varying lengths.

As the brush surface may after considerable use become worn I provide for its ready replacement by mounting the tufts of bristles on a stiff back A' of wood, bone, metal or other hard material, the said back A' being adapted to fit in a shell like shoe A forming the brake block or spoon, and to be fixed therein by means of a screw $a$, passing through a hole in the back A' and threaded into the shoe A as shown by Fig. 4 Sheet No. 1 of the accompanying drawings. As this construction necessitates the removal of the shoe A before the brush surface C can be removed, I prefer to make one end open as shown by Figs. 5 and 6 Sheet No. 2 so that the back A' can be slid into the shoe A, in which it is retained in position by the screw $a$ threaded into the shoe A and impinging on the back A' as shown by Fig. 5 Sheet No. 2. The rear part of the brush $a'$ and of the block, spoon or shoe carrying it is made of a wedge-shape as shown by Figs. 2 and 3 Sheet No. 1, and 5 and 7 Sheet No. 2 which assists in throwing the mud and dirt off the tire and thus prevents the brush from becoming clogged.

I am aware that it has been proposed to use a flexible backed brush in combination with the brake lever or spoons of cycles and other vehicles, and I do not therefore claim the use of a brush brake broadly, but What I do claim as my invention, and desire to secure by Letters Patent, is—

1. A brake consisting of a rigid block spoon, or shoe, adapted to be fixed to the brake operating bar and having a brush operating surface which is curved transversely to fit the transverse shape of the tire it is intended to act upon, and which is wedge-shaped at its rear end, as set forth.

2. A brake consisting of a metallic shoe adapted to be attached to the brake operating bar, of a rigid block adapted to fit in the metallic shoe and having a brush like surface, the rear end of which is wedge-shaped, as set forth.

3. A brush brake having its back or rear edge wedge shaped as and for the purpose set forth.

4. In a brake for rubber tired wheels, the combination of the rigid shell-like shoe A, of the rigid back A' having a brush surface C and adapted to fit in the rigid shell-like shoe A and having its rear or back end or edge "$a'$" wedge-shaped, and of a screw "$a$" adapted to fix the back A' to the shoe A, as set forth.

5. In a brake for rubber tired wheels, the combination of a rigid shell-like shoe A the rear end of which is open and the front or back end of which—which is wedge-shaped—is closed, of a rigid back A' having a brush surface C wedge-shaped at its rear or back end and adapted to slide into the shell-like shoe A through the front end thereof, and of the screw "$a$" adapted to lock the back A' to the shoe A, as set forth.

ARTHUR CHARLES ROPER.

Witnesses:
  T. J. BREMRIDGE,
  H. FORDJUN,
    *Solicitors, Exeter, England.*